Oct. 20, 1959   B. L. SHRADER   2,908,935
POULTRY GIZZARD SKINNER
Filed May 7, 1958

INVENTOR
BURNES L. SHRADER
BY
*Lamont Johnston*
ATTORNEY

United States Patent Office 2,908,935
Patented Oct. 20, 1959

2,908,935

POULTRY GIZZARD SKINNER

Burnes Luther Shrader, Chattanooga, Tenn.

Application May 7, 1958, Serial No. 733,596

2 Claims. (Cl. 17—11)

This invention relates to an apparatus for removing the linings from poultry gizzards.

In the dressing of poultry for the market, particularly that which is to be cut, packaged, and frozen before distribution, it is desirable to have each portion of the bird completely prepared for cooking. The product is more salable if all the housewife has to do is to place it in a pan and cook it. To this end, the gizzards of the birds are cut open and the inner lining of the gizzard is removed before it is packaged and frozen.

By the present invention, there is provided a device for the quick and easy removal of the gizzard skins to speed the processing of poultry and to reduce the cost which is involved. The saving in labor cost for a nominal capital expenditure is substantial.

In Reissue Patent No. 23,758, issued December 29, 1953, to Darrow et al., there is disclosed a poultry gizzard skinner having a pair of rollers with annular, interdigitating ridges, the peripheries of the ridges being knurled and having notches therein for grasping the skin and pulling it off the gizzard. In a relatively short period of time, the knurled outer surfaces wear off and the space between the periphery of each ridge and the axle of the adjacent roller becomes greater. When this happens, the skins will slip and will not be drawn off the gizzards reliably.

In Patent No. 2,630,599, issued March 10, 1953, to Grant et al., there is disclosed a gizzard skinner comprising a pair of rollers having spiral, interdigitating ridges, the peripheries of which have knurled, serrated or roughened surfaces. In addition the aforementioned disadvantage of slippage when the knurled surfaces become worn, the spirally ridged rollers of this patent operate too slowly to be satisfactory.

One object of this invention is to provide a poultry gizzard skinner having a pair of rollers with intermeshing gear teeth thereon which will grasp the skin of the poultry without slipping, until the gear teeth wear completely out.

Another object is to provide a poultry gizzard skinner which will wear much longer than previously known devices while still being effective in operation.

A further object of this invention is to provide a poultry gizzard skinner having a pair of rollers with axially spaced gears thereon, the gears on one roller being staggered relative to the gears on the other roller and intermeshing therewith to grasp the skin of the poultry.

Other objects and advantages of the invention will be apparent from the following description, taken in conjunction with the accompanying drawings, in which.

Figure 1:
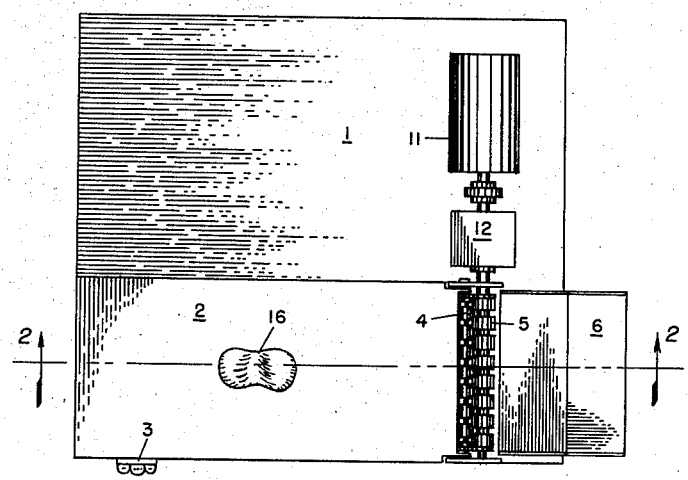
Fig. 1 is a plan view of an embodiment of the invention.

In the drawings, there is illustrated a frame 1 which supports a feed plate 2, over which the gizzards are moved to the rollers. A bracket 3 may be provided for vertical adjustment of the feed plate 2, in a manner similar to that illustrated in Reissue Patent No. 23,758, the feed plate 2 being pivoted about the shaft of a roller 4 which is mounted for rotation about an axis generally transverse to the length of the feed plate 2, in journals suitably supported by the frame 1. Another roller 5, the axis of which is parallel to that of the roller 4, is mounted adjacent thereto, each of the rollers 4 and 5 having thereabout a plurality of gears 7 and 8 which are evenly spaced axially. Between the gears 7 on the roller 4 there are equal axial spaces 9 and between the gears 8 on the roller 5 there are equal spaces 10. Each gear 7 straddles or spans the space 10 between a pair of gears 8 on the other roller and intermeshes with both of those gears. Correspondingly, each gear 8 straddles or spans the space 9 between a pair of adjacent gears 7 and meshes with both of those gears. In other words, the gears 7 and 8 are staggered with respect to each other, each gear on one roller overlapping and meshing with a pair of gears on the other roller.

A suitable power means, such as an electric motor 11, is provided for actuating, through a suitable gear mechanism in a gear case 12, one of the rollers, such as the roller 5. Since the gears 7 and 8 on the rollers 4 and 5 are in intermeshing engagement, rotation of the roller 5 by means of the electric motor 11 will also cause rotation of the roller 4. The direction of rotation of the rollers is as indicated by the arrows in Fig. 2.

Figure 2:
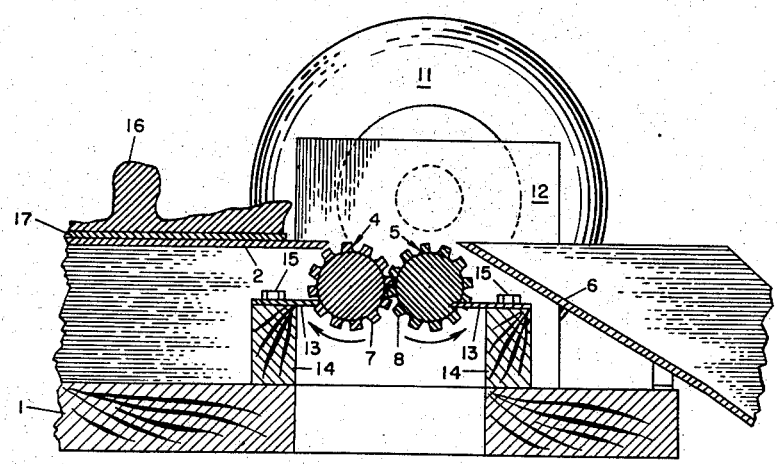
Fig. 2 is an enlarged elevational section taken on the line 2—2 of Fig. 1, with parts broken away.
Figure 3:
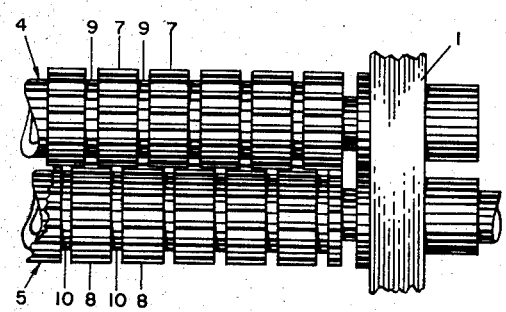
Fig. 3 is an enlarged fragmentary plan view of a portion of a pulling roller.

As illustrated in Fig. 2, in order to facilitate the cleaning of the machine and to strip any skins from the rollers should they tend to stick to the rollers and revolve therewith, there is provided a pair of combs 13 which contact the shaft portions of the rollers 4 and 5 in the openings 9 and 10, respectively, between the gears 7 and the gears 8. The combs are mounted on pillars 14 supported by the frame 1 and are attached thereto by stud bolts 15, so that the combs may be removed for cleaning, if so desired.

In operation, a gizzard 16, which has been cut open, is placed with its lining or skin 17 down on the feed plate 2, over which the gizzard is moved to the rollers 4 and 5. After the lining or skin has been removed, the gizzard is discharged over the conveyor or chute 6. As the gizzard comes into contact with the gears 7 and 8 on the rollers 4 and 5, the gears grasp and clamp the bottom of the skin 17, drawing it downwardly between the rotating gears. Since the gizzard, itself, is too spongy and bulky to be caught between the teeth of the gears 7 and 8, it passes on across and is discharged over the chute 6. Should a skin become caught on one of the gears 7 or 8, it will be removed from the gears as they rotate past the combs 13. Feeding of the skin or lining 17 between the rollers 4 and 5 is automatically performed by contact with the gears 7 and 8 on the rollers. Even if only a portion of the skin or lining 17 should be initially removed, the gears 7 and 8 will again catch the remainder of the lining and pull it between them.

The feed plate 2 may be constructed in the same manner as the feed plate in Reissue Patent No. 23,758, or in any other manner so long as provision is made for moving the gizzard 16 with the lining 17 down, toward and across the top of the rollers 4 and 5 in such a manner that the lining 17 may be engaged by the gears 7 and 8 on the rollers 4 and 5 for stripping the lining from the gizzard.

By this invention, there is provided a device for removing the linings from poultry gizzards which will grasp the skins or linings without slipping, until the gear teeth wear completely out. Due to the clamping action between the gears, the device pulls the skins tighter than do previously known devices and the skins will never slip. This machine will run four to five times as long, while operating in a satisfactory manner, as will previously known poultry gizzard skinners, such as that disclosed in Darrow et al. Reissue Patent No. 23,758. In contrast to the situation in a machine made in accordance with the aforesaid patent, when the knurls on the peripheries of the ridges in that patent become worn, the skins will slip, but no such disadvantage is present in a machine made in accordance with the present invention.

In contrast with a poultry gizzard skinner like that shown in Grant et al. Patent No. 2,630,599, having rollers with spiral interdigitating ridges, the present machine is much faster in operation, as well as being longer lasting.

A further advantage of this invention is that the rollers in the Darrow et al. Reissue Patent No. 23,758 and in the Grant et al. Patent No. 2,630,599 require a great deal of painstaking and expensive machining for their manufacture. By contrast, a device made in accordance with the present invention is relatively inexpensive in manufacture, since the rollers with gears thereon can be made of standard Boston gear stock, or drawn pinion wire. The only machining required with such stock is to cut up and turn the heads, with the result that machining time is reduced to about one-third of that required for the rollers shown in the aforesaid patents.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. A device for removing the lining from poultry gizzards, said device including a frame, a pair of rollers each having a plurality of gears thereabout evenly spaced axially, each gear on one roller straddling the space between a pair of gears on the other roller and meshing with said pair of gears, said rollers being journaled in said frame, and power means connected to one of said rollers to rotate it.

2. A device for removing the lining from poultry gizzards, said device including a frame, a pair of rollers each having a plurality of gears thereabout with equal axial spaces between the gears, each gear on one rollers spanning the space between adjacent gears on the other roller and meshing with said adjacent gears, said rollers being journaled in said frame, and power means connected to one of said rollers to rotate it.

References Cited in the file of this patent

UNITED STATES PATENTS

| | | |
|---|---|---|
| 2,620,510 | Darrow et al. | Dec. 9, 1952 |
| 2,630,599 | Grant et al. | Mar. 10, 1953 |
| 2,791,798 | Shickel et al. | May 14, 1957 |
| 2,861,293 | Platt | Nov. 25, 1958 |